3,032,390
PROCESS FOR THE PREPARATION OF COMPOSITION OF ALUMINUM, TITANIUM AND CHLORINE HAVING APPROXIMATE COMPOSITION AlTi₃Cl₁₂
Anthony David Caunt, Welwyn Garden City, England, assignor to Imperial Chemical Industries Limited, London, England, a corporation of Great Britain
Filed July 6, 1960, Ser. No. 41,061
Claims priority, application Great Britain July 6, 1959
1 Claim. (Cl. 23—51)

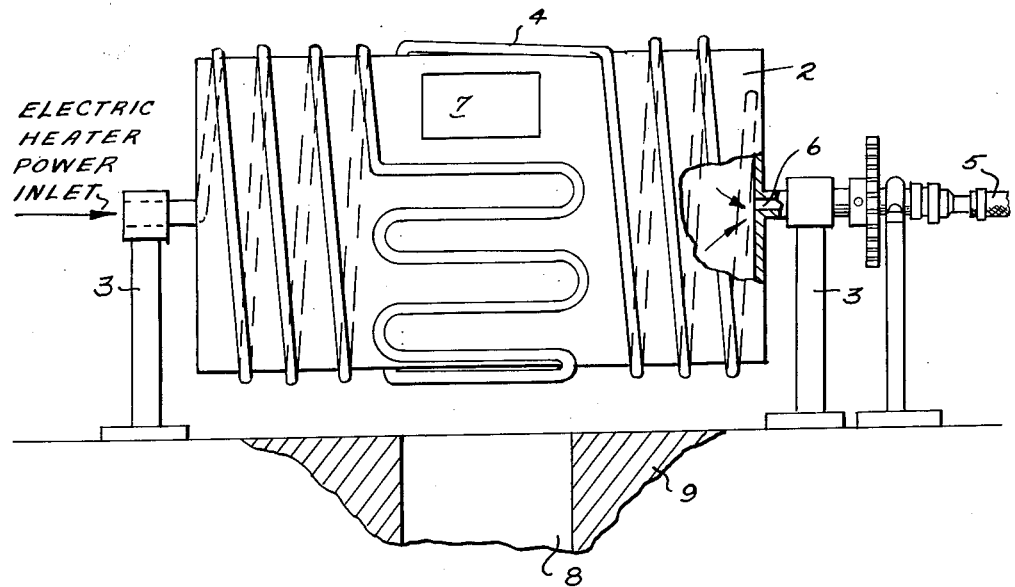

This invention relates to the preparation of compositions of aluminium, titanium and chlorine having the approximate composition $AlTi_3Cl_{12}$ which compositions are useful as catalyst components useful in alpha-olefin polymerisation, particularly the polymerisation of propylene to polypropylene of high isotactic content.

In U.S. application Serial No. 816,050 the above compositions and their preparation have been described. Broadly the compositions may be prepared by reacting aluminium with titanium tetrachloride at a temperature in the range 80° to 220° C. and then removing any unreacted titanium tetrachloride. Normally, the reaction is catalysed by an aluminium halide, e.g. aluminium chloride and the product formed, a hard cake, is then dried under vacuum to remove any unreacted titanium tetrachloride and aluminium halide. Preferably, the composition is ball milled and then mixed with an organo-metallic compound of aluminium to form a catalyst for olefine polymerisation. In large scale preparations of the composition the hard cake above referred to is difficult to handle. The object of this invention is to avoid the formation of such a hard cake. Other objects will become apparent from the following description.

This invention provides a process for the preparation of the said compositions wherein aluminium is reacted with titanium tetrachloride in a heated grinding machine at a temperature in the range 80° to 220° C., preferably in the range 100° to 200° C.

The grinding machine is operated during the reaction period and it is believed that the grinding produces fresh aluminium surfaces and enables the reaction to start. The preferred grinding machine is a ball mill.

On completion of the reaction the excess, if any, of titanium tetrachloride may be distilled off and the product, a free flowing powder, dried under vacuum. The product is then preferably ground, e.g. in a ball mill, further at room temperature in the dry state. If the grinding machine is not only adapted to be heated but also to be evacuated so that the vacuum drying can be carried out within it, the complete preparation of the composition of matter, suitable for immediate use in preparing a catalyst, may be carried out without the need to transfer the material from one piece of apparatus to another, thus leading to a very convenient process for making the composition on a large scale. A high yield of composition may be obtained and when more than a stoichiometric amount of $TiCl_4$ is used, the composition has a low free aluminium content. A low free aluminium content is desirable since aluminium may be difficult to remove from the polymers made using the compositions although the catalytic properties of the composition are unimpaired.

The compositions of this invention may be used to prepare catalyst suspensions for polymerising olefines, particularly for polymerising olefines according to U.S. application Serial No. 816,050 in which the catalyst is prepared by mixing the ground composition of matter with a dialkyl aluminium chloride or bromide. In this way propylene may be conveniently polymerised to polypropylene containing 85% or more of isotactic polypropylene.

The compositions of matter of this invention should preferably be prepared in the presence of no more than small amounts of oxygen and water, preferably under an atmosphere of dry nitrogen, since substantial amounts of oxygen and water impair their catalytic activity.

This invention is illustrated by, but in no way limited to the precise details of the following example.

*Example*

A stainless steel mill 12″ in diameter and 4″ long was fitted with 6 baffles to lift the balls and charged to 45% of its volume with ½″ diameter stainless steel balls, purged with nitrogen and charged with 18.5 g. aluminium (equivalent to 390 g. $TiCl_4$) and 786.5 g. $TiCl_4$. The mill was rotated at 3½ r.p.m. and heated in an oil bath, being maintained at 148–152° C., for 10 hours. Excess $TiCl_4$ was then distilled from the mill and the product dried in the mill at 180° C. under vacuum. On cooling the mill an aliquot of product (a free flowing powder) was removed and found [1] to contain about 0.05% by weight of unreacted aluminium. The product was crystalline and contained aluminium titanium and chlorine substantially combined as $AlTi_3Cl_{12}$. The yield of product at this stage was 387 g. (94.5% based on total aluminium powder containing 96% free metal) of a free-flowing powder.

The material was then further ball milled for 18 hours and 1 g. used for polymerisation of propylene as follows. A 5 litre autoclave equipped with a stirrer was flushed out with nitrogen and 2 l. of petroleum ether (B.P. 60–80°), 26 millimoles diethyl aluminium chloride, 1 g. of the ball milled $AlTi_3Cl_{12}$ and 220 cc. propylene added. The mixture was stirred and heated rapidly to 70° C. when polymerisation took place. After 5¼ hours polymer (91 g.) was obtained as a fine powder, 10% of which was soluble in ether.

A suitable ball mill for carrying out the process of the invention is diagrammatically shown in the accompanying drawing. As shown, the ball mill comprises a ball milling assembly 2, suitably supported by means 3. Appropriate electrical heating means 4 or the like are provided for supplying heat to the assembly and the numeral 5 represents means for maintaining a vacuum within the assembly through the opening 6. Filling and discharging of the assembly are accomplished through a door member 7 and an appropriate pit 8 is provided in the supporting surface 9 to facilitate emptying the assembly through member 7.

I claim:
A process for the preparation of compositions of

---

[1] The amount of free aluminium was determined as follows: 50 ml. of 3,5,5 trimethyl hexanol-1 and 150 ml. petroleum ether (B.P. 60–80°) were refluxed under nitrogen to remove air. A weighed sample of the reaction product (about 1 g.) was dropped into the hot solution and the mixture refluxed under nitrogen for ½ hour. A deep blue solution was obtained and a small amount of aluminium sedimented out, this was filtered on a sintered glass filter (20–30 microns pore size) and washed with 200 ml. petroleum ether while under nitrogen. The sinter was dried and the free aluminium in the insoluble residue determined from the quantity of hydrogen evolved when dissolved in N-caustic soda solution.

aluminium, titanium and chlorine having the approximate composition $AlTi_3Cl_{12}$ which comprises reacting together aluminium and titanium tetrachloride in a heated ball mill at a temperature between 100° C. and 200° C. using more than the stoichiometric amount of titanium tetrachloride and, after the reaction is completed, distilling off liquids present, drying the product in vacuum while it is still in the ball mill and then further ball milling in a dry condition without removing same from the ball mill.

References Cited in the file of this patent

UNITED STATES PATENTS 2,316,043  Billings _____ Apr. 6, 1943

OTHER REFERENCES

"Encyclopedia of Chemical Reactions," by Jacobson, vol. 7, 1958 ed., page 401. Reinhold Publishing Corp., New York.

Chemical Engineers' Handbook, third ed., by Perry, pages 1130, 1134, 1136, 1138. McGraw-Hill Publishing Co., New York.